United States Patent [19]

Goscenski, Jr.

[11] 4,077,279
[45] Mar. 7, 1978

[54] DIFFERENTIAL GEAR MECHANISM

[75] Inventor: Edward J. Goscenski, Jr., Battle Creek, Mich.

[73] Assignee: Eaton Corporation, Cleveland, Ohio

[21] Appl. No.: 739,757

[22] Filed: Nov. 8, 1976

Related U.S. Application Data

[63] Continuation of Ser. No. 572,234, Apr. 28, 1975, abandoned.

[51] Int. Cl.² ............................................. F16H 1/44
[52] U.S. Cl. ........................................ 74/711; 74/713
[58] Field of Search .............................. 74/711, 713

[56] References Cited

U.S. PATENT DOCUMENTS

| | | | |
|---|---|---|---|
| 1,348,822 | 8/1920 | Ricketts | 74/713 X |
| 2,267,362 | 12/1941 | Ash | 74/711 X |
| 2,592,668 | 4/1952 | Dufour | 74/711 |
| 3,517,573 | 6/1970 | Roper | 74/711 |
| 3,606,803 | 9/1971 | Ottemann | 74/711 |
| 3,748,928 | 7/1973 | Shiber | 74/711 |
| 3,811,341 | 5/1974 | Goscenski, Jr. | 74/711 |
| 3,828,877 | 8/1974 | Fogelberg | 74/711 X |
| 3,838,610 | 10/1974 | Fogelberg | 74/711 |
| 3,894,446 | 7/1975 | Snoy et al. | 74/711 |
| 3,923,113 | 12/1975 | Pagdin | 74/711 X |

*Primary Examiner*—Samuel Scott
*Assistant Examiner*—Carl F. Pietruszka
*Attorney, Agent, or Firm*—J. R. Teagno

[57] ABSTRACT

A differential gear mechanism of the side gear type includes the provision of an annular extension from one side gear which provides a housing and a bearing surface for the pinions at the differential. An oscillating weight member is carried by the annular extension. The member senses the occurrence of differential rotation between the side gears and actuates a locking mechanism upon the occurrence of a predetermined degree of differential rotation.

The differential as disclosed comprises a transfer case operative to transfer power from the prime mover of a four wheel drive vehicle to its front and rear drive axles.

9 Claims, 2 Drawing Figures

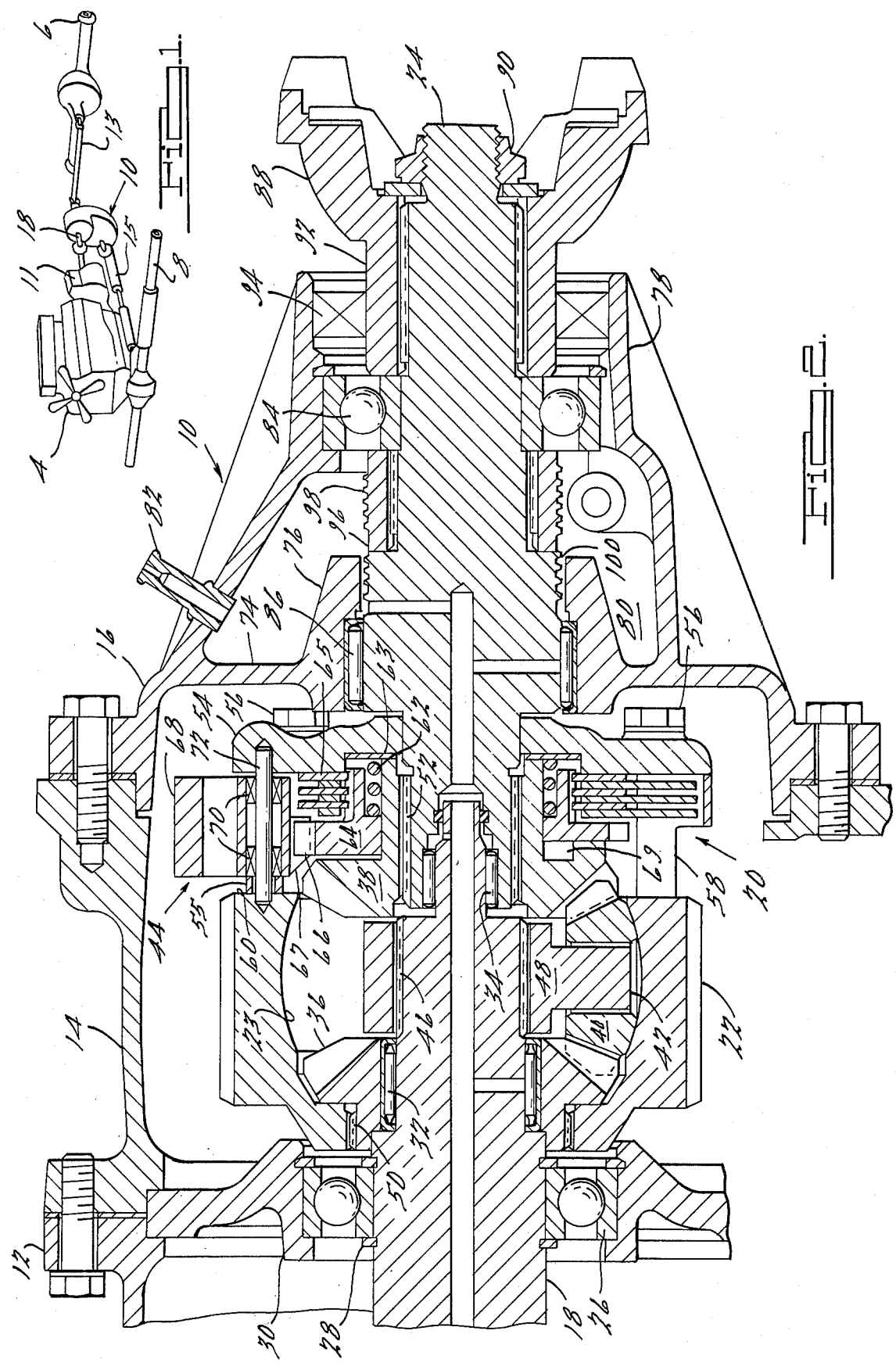

DIFFERENTIAL GEAR MECHANISM

This is a continuation of application Ser. No. 572,234, filed Apr. 28, 1975, now abandoned.

BACKGROUND OF THE INVENTION

1. Field of the Invention

The present invention relates generally to differential gear mechanisms of the side gear type and more specifically to those including means for locking up the differential upon the occurrence of a predetermined degree of differentiation, and to the construction of transfer cases for four wheel drive vehicles utilizing such differential gear mechanisms.

2. Description of the Prior Art

Differential gear mechanisms of the side gear type are well known in the art. See, for example, U.S. Pat. No. 2,932,218 (Russell). They have generally included a pair of side gears and one or more pinion gears carried for rotation in a housing to which bearing means are fixed for supporting the pinions.

Also well known in the prior art is the use of side gear type differentials in four wheel drive transfer cases and the provision of means for detecting the occurrence of a predetermined amount of differentiation and thereupon preventing further differential action. Examples of these features may be seen in U.S. Pat. No. 3,811,341 of applicant. Although these prior art locking differentials have been generally satisfactory, certain disadvantages have been noted.

First, the capacity of clutches used in the lock up mechanisms must be relatively high since they carry the load between the input and one of the outputs.

Further, the means employed to sense the occurrence of differentiation in prior art devices have been found to be critically sensitive to variations in tolerances, friction forces, and inertias of moving parts.

Still further, the necessity of providing a separate pinion housing and separate pinion bearing structure makes these differential gear mechanisms a relatively expensive element in vehicle drive lines.

Still further, the prior art locking differentials, when employed in a transfer case environment, are long when measured along the axis of the drive line since the side gears in this environment are spaced axially along the drive line axis and the front axle power take off member is disposed outboard of the associated side gear.

SUMMARY OF THE INVENTION

It is an object of the present invention to provide an improved locking differential gear mechanism of the side gear type requiring reduced capacity of the lock up clutch.

It is another object to provide an improved locking differential gear mechanism of the side gear type whose differention sensing means generates a high signal force compared to prior art devices.

It is a further object to provide an improved locking differential gear mechanism of the side gear type having a reduced number of parts.

It is a still further object to provide an interaxle differential drive mechanism having a reduced length measured along the vehicle axis.

According to one feature of the present invention the locking element of a differential gear mechanism of the side gear type is operatively carried between the side gears. This placement reduces the required capacity of the locking element by one half from that of the prior art devices since the necessary locking torque is that developed as a difference between the two outputs of the differential rather than the difference between the input and one output.

According to another feature, the means for sensing the occurrence of differentiation and for actuating the locking member is carried by one of the side gears and takes a rotational signal from the other. As compared to prior art devices, this arrangement results in a doubling of the speed signal to the sensing means and a resulting increase in actuating force which eliminates the critical sensitivity to variations in tolerances, friction forces, and moving part inertias.

According to still another feature, one side gear is provided with an annular extension which serves as a housing for the pinion gears of the mechanism. This arrangement both reduces the number of parts required in the differential and reduces its overall length measured along the vehicle drive line.

According to still another feature, the annular extension provides a bearing surface for the pinions of the differential, thereby further reducing the number of parts required.

BRIEF DESCRIPTION OF THE DRAWINGS

These objects and features as well as others will become apparent to those skilled in the art of differential gear mechanisms upon reading the accompanying written description with reference to the drawing in which:

FIG. 1 is a perspective view of a drive train for a four wheel drive vehicle embodying a differential gear mechanism according to the invention; and FIG. 2 is a fragmentary cross sectional view of the invention differential gear mechanism.

DESCRIPTION OF THE PREFERRED EMBODIMENT

The drive train seen in perspective in FIG. 1 includes an internal combustion engine 4, a transmission 11, and a differential gear mechanism in the form of a transfer case 10 transmitting power through a rear drive shaft 13 to a rear axle assembly 6 and through a front drive shaft 15 to a front axle assembly 8.

Referring now to FIG. 2 transfer case 10 is illustrated in FIG. 2 as including front 12, intermediate 14, and rear 16 housings.

The front housing 12, only a portion of which is shown, is adapted to contain components effecting the delivery of power from the vehicle's transmission 11 to an input shaft 18.

The intermediate housing 14 encloses a side gear type locking differential gear set 20 with which is carried an output sprocket 22 by which power is taken off for the front drive shaft 15 of the vehicle.

The rear housing 16 carries an output shaft 24 which is driven by the gear set 20 to provide power for the rear wheels of the vehicle.

Returning now to the front housing 12, the preferred embodiment may be considered in greater detail. The input shaft 18 is illustrated as a stepped shaft whose major radial load is partially carried by an antifriction bearing 26 axially retained on the shaft 18 by snap rings 28 or the like and shouldered in a bearing housing 30, which is held in place between the front and intermediate housings 12 and 14, respectively. Antifriction bearings 32 and 34 provide for radial support of the differential 20 and the output shaft 24 and allow for relative rotational movement to be later described.

The gear set 20 is illustrated as comprising first and second side gears 36 and 38, a plurality of pinion gears 40 each of which is carried for rotation on a pinion shaft 42, and a lock up mechanism indicated generally at 44.

The pinion shafts 42 are illustrated as fixed to the input shaft through a spline connection 46 at a hub portion 48 which circumferentially interconnects the pinion shafts 42 in a manner well known in the art, this structure commonly being referred to as a spider. The pinion gears 40 are in mesh with side gears 36 and 38.

First side gear 36 is rotatably carried on the input shaft 18 at bearing 32 and is fixed to the front wheel output sprocket 22 by serrations or the like at 50. The sprocket 22, in turn, carries a portion of the lock up mechanism 44 in a manner to be hereinafter described. The sprocket 22 also provides a hardened bearing surface 23 for the pinion gears 40.

Second side gear 38 is shown as being fixed to the output shaft 24 through a spline connection 52. It is also connected to a portion of the lock up mechanism 44.

The lock up mechanism 44 comprises components essentially identical to those described in applicant's previously issued U.S. Pat. No. 3,811,341 which is incorporated herein by reference. They are retained in the present embodiment by a lock up housing 54 having a central opening to receive the components and fixed to the sprocket 22 by threaded fasteners 56 extending through local bosses 58 through the rear face 60 of the sprocket 22. A spring 62 is bottomed on washer 63 and urges a cam member 64 against the second side gear 38, the rear face of which includes a mating cam surface indicated at 69.

The outer peripheral surface of the cam member 64 includes teeth 66 which engage teeth 67 of a weight 68 carried for rotation with the sprocket 22 by mounting the weight 68 with suitable bearing members 70 for oscillation about a pin 72 carried between the sprocket 22 and the lock up housing 54 separated therefrom by a spacer 55. FIG. 2 of the U.S. Pat. No. 3,811,341 best shows this tooth engagement.

A disc pack friction clutch 65 is disposed between the cam member 64 and the housing 54 in the manner described in the referenced patent.

The rear housing 16 includes a front wall portion 74, a rearward extending hub portion 76, a rear bearing housing portion 78, and a lubrication cavity 80 defined intermediate the front and rear portions. A breather plug 82 communicates the cavity 80 with the atmosphere to allow operation over an extended temperature range.

The output shaft 24 is carried by bearings 84 and 86 which are housed in the hub portion 76 and the rear bearing housing 78, respectively. A yoke 88 is splined to the shaft 24 and axially retained by a suitable fastener 90. Power is transmitted to the rear drive axle by the yoke 88, which further includes a hub portion 92 which provides a running surface for a shaft seal 94 which is also carried in the rear housing portion 78.

A collar 96 having disposed thereon a speedometer thread 98 is also spline connected to the output shaft 24 to provide a signal for the vehicle speedometer (not shown).

Also included in the output shaft 24 is a threaded portion 100 registering with the rearward end of the hub portion 76 adjacent to and communicating with the lubrication cavity 80 and lubrication passages 102 extending therefrom to communicate with similar passages 104 in the input shaft 18. By this network, lubricating fluid is supplied to the bearings of the assembly described.

OPERATION OF THE PREFERRED EMBODIMENT

During normal vehicle operation, when the loading of front and rear wheels is matched, no differentiation occurs; and torque is split between the two drive axles by the gear set 20 in the following manner: Power from the vehicle transmission is taken through the input shaft 18 which carries the pinion gears 40. The pinion gears 40, in turn, drive the side gears 36 and 38 and thereby the output sprocket 22 and the output shaft 24 to which the side gears 36 and 38 are, respectively fixed. Unbalanced forces which are more prevalent during differentiation on the pinion gears 40 are supported by the hardened bearing surface 23 in the output sprocket 22. While the loads on the two outputs 22 and 24 are matched, the mating surfaces of the cam member 64 and the second side gear 38 are fully engaged as is best illustrated in FIG. 3 of U.S. Pat. No. 3,811,341, the elements of the disc pack are free to rotate, and no oscillation of the toothed weight 68 takes place since there is no relative motion between it and the cam member 64.

When a load difference exists and a resultant difference in speed between the side gears 36 and 38 occurs, the weight 68, which is rotating with the sprocket 22 and the first side gear 36, is caused to oscillate about the pin 72 by the interaction of the teeth 67 of the weight 68 and the teeth 66 formed on the cam member 64. (This interaction may best be seen in FIG. 2 of U.S. Pat. No. 3,811,341). A retarding torque proportional to the square of the speed of oscillation of the weight member 68, which speed is doubled in the preferred embodiment over that of the invention of the U.S. Pat. No. 3,811,341, is transmitted to the cam member 64. This retarding torque urges the mating surfaces of the second side gear 38 and the cam member 64 toward the condition illustrated in FIG. 4 of U.S. Pat. No. 3,811,341. This causes an axial displacement of the cam member 64 in the rightward direction as viewed in the drawing to actuate the disc pack, effecting a lock between the side gears 36 and 38 to prevent further differentiation. It should be noted again that this lock is effected in the present invention with half the torque absorbed by the clutch as compared to prior devices which effect a lock between a side gear and a housing.

While only one preferred embodiment, an interaxle differential gear mechanism, of the present invention has been shown it will be clear to those skilled in the art of differential gear mechanisms that the invention can be used in other differential gear mechanisms of the side gear type.

What is claimed is:

1. An inter-axle differential gear mechanism of the side gear type for transmitting power to front and rear axles used to drive a vehicle, said mechanism comprising two annular side gears mounted for rotation about a common axis, each side gear having an annular array of teeth, an axially extending output shaft rotatably mounted and coaxial with one of said side gears and adapted to rotate one of said axles, one or more pinion gears having teeth engaging the teeth of said side gears an annular toothed output member to rotate the other axle and carried for rotation with and encircling the other side gear and extending axially therefrom toward the one side gear, a portion of said teeth on said annular output member being disposed in a plane intermediate said teeth of said side gears, and means supporting each pinion gear for rotation relative to said toothed output member about said axis of said side gears and for rotation about a second axis not coaxial with said axis of said side gears, said supporting means including an axially extending input shaft coaxial with said side gears and passing axially internally of the other side gear, and a spider secured for rotation to said input shaft intermediate said side gears and including a radially extending pinion shaft for each pinion gear, each pinion gear being mounted for rotation upon one of said pinion shafts.

2. A gear mechanism according to claim 1 further comprising means for sensing the occurrence of a predetermined amount of differential action between said outputs and thereupon activating a member to retard further differential action, said sensing and activating means being connected for corresponding rotational movement with one of said outputs and operatively engaged with the other output to receive a rotational signal analogous to the occurrence of differential action between said outputs.

3. A gear mechanism according to claim 2 wherein said sensing and actuating means comprises a weight mounted for oscillation about an axis disposed radially from the axis of rotation of the side gears.

4. A gear mechanism according to claim 2 wherein said retarding member comprises a disc pack clutch member operable to drivingly interconnect said side gears.

5. A gear mechanism as defined in claim 2 wherein said sensing and actuating means comprises:
an annular actuator member having cam surfaces defined on one annular end face and confronting said one side gear to drivingly engage complementary cam surfaces defined on said one side gear and having a toothed radially outer surface;
an annular housing carried for rotation with said output member for axially retaining said actuator member, said actuator member being axially movable in response to the retarding of rotation of said actuator member with respect to said one side gear from a first position wherein said cam surfaces are fully engaged to a second position wherein said cam surfaces are partially engaged;
means for effecting the retardation of said actuator member; and
a disc pack clutch member carried between the other end face of said actuator member and a confronting face of said annular housing and operable in response to movement of said actuator member from said first position to said second position to drivingly interconnect said actuator member and said annular housing.

6. An interaxle differential gear mechanism as defined in claim 5 wherein said retarding means comprises:
a toothed weight member operatively engaging said toothed outer surface of said actuator member and supported for oscillation about a pin carried between said output member and said annular housing to sense a predetermined amount of difference in angular velocity between said side gears and thereupon to retard the rotation of said actuator member to displace it axially to said second position and operate said disc pack clutch member to drivingly interconnect said actuator member and said annular housing and thereby lock up said side gears.

7. A gear mechanism according to claim 2 wherein said sensing and activating means prevents further differential action.

8. A gear mechanism according to claim 7 wherein said one side gear includes an axially extending hub and said sensing and activating means is disposed annularly around said one side gear and said hub.

9. A gear mechanism according to claim 1 wherein each pinion gear has an outer bearing surface defined by a segment of a sphere, and said output member provides a housing for each pinion gear and has an inner circumferential bearing surface having a circular cross sectional portion struck from a radius substantially equal to the radius used to form the spherical segment of the outer bearing surface of each pinion gear, said inner bearing surface being in sliding engagement with said outer bearing surface of each pinion gear.

* * * * *